US010277135B2

(12) United States Patent
Li (10) Patent No.: US 10,277,135 B2
(45) Date of Patent: Apr. 30, 2019

(54) DUAL-OUTPUT FLYBACK VOLTAGE CONVERSION CIRCUIT AND DISPLAY DEVICE

(71) Applicant: Shenzhen China Star Optoelectronics Technology Co., Ltd., Shenzhen (CN)

(72) Inventor: Wendong Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/567,089

(22) PCT Filed: Apr. 18, 2017

(86) PCT No.: PCT/CN2017/080929
§ 371 (c)(1),
(2) Date: Oct. 17, 2017

(87) PCT Pub. No.: WO2018/166030
PCT Pub. Date: Sep. 20, 2018

(65) Prior Publication Data
US 2018/0294733 A1 Oct. 11, 2018

(30) Foreign Application Priority Data

Mar. 14, 2017 (CN) .......................... 2017 1 0150204

(51) Int. Cl.
H05B 37/02 (2006.01)
H02M 3/335 (2006.01)
(Continued)

(52) U.S. Cl.
CPC .... *H02M 3/33561* (2013.01); *H05B 37/0209* (2013.01); *H02M 3/135* (2013.01);
(Continued)

(58) Field of Classification Search
CPC ........... H05B 33/0815; H05B 33/0887; H02M 3/135; H02M 3/155; G09G 3/3406
(Continued)

(56) References Cited

U.S. PATENT DOCUMENTS

2008/0062726 A1* 3/2008 Peng ..................... H02M 3/335
363/21.18
2011/0043510 A1* 2/2011 Kim ..................... G09G 3/3696
345/212
(Continued)

FOREIGN PATENT DOCUMENTS

CN 201008094 1/2008
CN 202435272 9/2012
TW 201101664 1/2011

*Primary Examiner* — Thuy V Tran (57) ABSTRACT

A dual-output flyback voltage conversion circuit and a display device are provided. The dual-output flyback voltage conversion circuit includes an input module, a voltage transformation module, an output module, and a feedback module. The input module is used for rectifying and filtering an input voltage. The voltage transformation module is used for performing a voltage conversion process on the input voltage which is obtained after rectifying and filtering. The output module is used for outputting a first output voltage and a second output voltage according to conversion voltages. The feedback module is used for controlling the voltage transformation module to output the input voltage which is obtained after rectifying and filtering according to the first output voltage and the second output voltage.

17 Claims, 2 Drawing Sheets (51) Int. Cl.
  *H02M 3/155* (2006.01)
  *H02M 3/135* (2006.01)
  *H05B 33/08* (2006.01)
(52) U.S. Cl.
  CPC ......... *H02M 3/155* (2013.01); *H05B 33/0815* (2013.01); *H05B 33/0887* (2013.01)
(58) Field of Classification Search
  USPC .............. 315/209 R, 219, 276, 291; 345/102
  See application file for complete search history.

(56) References Cited

U.S. PATENT DOCUMENTS

2012/0153866 A1* 6/2012 Liu ................... H02M 3/33561
   315/294
2017/0288557 A1* 10/2017 Fang ....................... H02M 1/15

\* cited by examiner

DUAL-OUTPUT FLYBACK VOLTAGE CONVERSION CIRCUIT AND DISPLAY DEVICE

RELATED APPLICATIONS

This application is a National Phase of PCT Patent Application No. PCT/CN2017/080929 having International filing date of Apr. 18, 2017, which claims the benefit of priority of Chinese Patent Application No. 201710150204.7 filed on Mar. 14, 2017. The contents of the above applications are all incorporated by reference as if fully set forth herein in their entirety.

FIELD AND BACKGROUND OF THE INVENTION

The present disclosure relates to the field of circuit design, and more particularly to a dual-output flyback voltage conversion circuit and a display device.

With the development of science and technology, people's requirements for display devices are getting increasing, especially in terms of stability and size. The display device is equipped with a voltage conversion circuit. Flyback voltage conversion circuits have advantages such as simple structure, small size, no magnetic reset required, and low production costs. Thus, flyback voltage conversion circuits are widely used in all kinds of low-power and medium-power display devices.

Since supply voltages in backlight components and main board components of the display device are different, the flyback voltage conversion circuit of the display device is required to output multiple sets of DC voltages so as to provide the corresponding supply voltage for the backlight components and main board components at the same time.

However, in general, the flyback voltage conversion circuit will perform a feedback control on only one of the multiple sets of DC voltages, such that the DC voltage which is directly subjected to feedback control will maintain a relatively stable DC voltage output, and a fluctuation will present in the other groups of DC voltages. There is therefore an offset of cross regulation between the multiple sets of DC voltages, thereby affecting the stability of the subsequent circuits of the display device.

Accordingly, it is necessary to provide a dual-output flyback voltage conversion circuit and a display device to solve the technical problem in the prior art.

SUMMARY OF THE INVENTION

The present disclosure provides a dual-output flyback voltage conversion circuit and a display device, by which a cross regulation can be adjusted and a stability of the subsequent circuits of the display device can be increased, so as to solve technical problems caused by the prior art dual-output flyback voltage conversion circuit and display device having poor cross regulation, and the subsequent circuits of the display device having poor stability.

The present disclosure provides a dual-output flyback voltage conversion circuit, including:

an input module, for rectifying and filtering an input voltage;

a voltage transformation module, for performing a voltage conversion process on the input voltage which is obtained after rectifying and filtering to obtain a first conversion voltage and a second conversion voltage;

an output module, for outputting a first output voltage according to the first conversion voltage, and outputting a second output voltage according to the second conversion voltage; and a feedback module, for controlling the voltage transformation module to output the input voltage which is obtained after rectifying and filtering according to the first output voltage and the second output voltage;

where the first output voltage is a main board driving voltage, and the second output voltage is a backlight driving voltage;

where the voltage transformation module includes:

a first input winding, where a first terminal of the first input winding is connected with the input module, and a second terminal of the first input winding is connected with the feedback module;

a first output winding, where a first terminal of the first output winding is grounded, and a second terminal of the first output winding is connected with the output module; and a second output winding, where a first terminal of the second output winding is connected with the second terminal of the first output winding, and a second terminal of the second output winding is connected with the output module;

where the output module includes a first output unit and a second output unit, where the first output unit includes a first group of diodes and a first capacitor, an anode of the first group of diodes is connected with the second terminal of the first output winding, a cathode of the first group of diodes outputs the first output voltage, a terminal of the first capacitor is connected with the cathode of the first group of diodes, and another terminal of the first capacitor is grounded; and where the second output unit includes a second group of diodes and a second capacitor, an anode of the second group of diodes is connected with the second terminal of the second output winding, a cathode of the second group of diodes outputs the second output voltage, a terminal of the second capacitor is connected with the cathode of the second group of diodes, and another terminal of the second capacitor is grounded.

The present disclosure also provides a dual-output flyback voltage conversion circuit, including:

an input module, for rectifying and filtering an input voltage;

a voltage transformation module, for performing a voltage conversion process on the input voltage which is obtained after rectifying and filtering to obtain a first conversion voltage and a second conversion voltage;

an output module, for outputting a first output voltage according to the first conversion voltage, and outputting a second output voltage according to the second conversion voltage; and a feedback module, for controlling the voltage transformation module to output the input voltage which is obtained after rectifying and filtering according to the first output voltage and the second output voltage.

In the dual-output flyback voltage conversion circuit of the present disclosure, the voltage transformation module includes:

a first input winding, where a first terminal of the first input winding is connected with the input module, and a second terminal of the first input winding is connected with the feedback module;

a first output winding, where a first terminal of the first output winding is grounded, and a second terminal of the first output winding is connected with the output module; and a second output winding, where a first terminal of the second output winding is connected with the second terminal of the first output winding, and a second terminal of the second output winding is connected with the output module.

In the dual-output flyback voltage conversion circuit of the present disclosure, the output module includes a first output unit and a second output unit, where the first output unit includes a first group of diodes and a first capacitor, an anode of the first group of diodes is connected with the second terminal of the first output winding, a cathode of the first group of diodes outputs the first output voltage, a terminal of the first capacitor is connected with the cathode of the first group of diodes, and another terminal of the first capacitor is grounded; and where the second output unit includes a second group of diodes and a second capacitor, an anode of the second group of diodes is connected with the second terminal of the second output winding, a cathode of the second group of diodes outputs the second output voltage, a terminal of the second capacitor is connected with the cathode of the second group of diodes, and another terminal of the second capacitor is grounded.

In the dual-output flyback voltage conversion circuit of the present disclosure, the first group of diodes includes at least two diodes which are connected in parallel with each other, and the second group of diodes includes at least two diodes which are connected in parallel with each other.

In the dual-output flyback voltage conversion circuit of the present disclosure, the feedback module includes a voltage regulator, a photoelectric conversion module, a pulse width modulation (PWM) controller, and a feedback switch transistor;

a control terminal of the voltage regulator is connected with the cathode of the first group of diodes through the first feedback resistor, and is connected with the cathode of the second group of diodes through the second feedback resistor, an input terminal of the voltage regulator is connected with the cathode of the second group of diodes, and an output terminal of the voltage regulator is grounded;

an input terminal of the photoelectric conversion module is connected with the cathode of the second group of diodes through the sense resistor, and an output terminal of the photoelectric conversion module is connected with a feedback terminal of the PWM controller;

a control terminal of the PWM controller is connected with a control terminal of the feedback switch transistor, an input terminal of the feedback switch transistor is connected with a second terminal of the first input winding, and a current sense terminal of the PWM controller is connected with an output terminal of the feedback switch transistor; and an output terminal of the feedback switch transistor is grounded.

In the dual-output flyback voltage conversion circuit of the present disclosure, a resistance ratio of the first feedback resistor and the second feedback resistor is determined by a ratio of output voltages of the first output unit and the second output unit.

In the dual-output flyback voltage conversion circuit of the present disclosure, the resistance ratio of the first feedback resistor and the second feedback resistor and the ratio of output voltages of the first output unit and the second output unit are approximately the same.

In the dual-output flyback voltage conversion circuit of the present disclosure, the first output voltage is a main board driving voltage, and the second output voltage is a backlight driving voltage.

In the dual-output flyback voltage conversion circuit of the present disclosure, the input module includes a rectifier bridge and a filter capacitor; and the input voltage is received by an input terminal of the rectifier bridge, an output terminal of the rectifier bridge is connected with a terminal of the filter capacitor and the voltage transformation module, respectively, and another terminal of the filter capacitor is grounded.

The present disclosure also provides a display device, including a dual-output flyback voltage conversion circuit, which includes:

an input module, for rectifying and filtering an input voltage;

a voltage transformation module, for performing a voltage conversion process on the input voltage which is obtained after rectifying and filtering to obtain a first conversion voltage and a second conversion voltage;

an output module, for outputting a first output voltage according to the first conversion voltage, and outputting a second output voltage according to the second conversion voltage; and a feedback module, for controlling the voltage transformation module to output the input voltage which is obtained after rectifying and filtering according to the first output voltage and the second output voltage.

In the display device of the present disclosure, the voltage transformation module includes:

a first input winding, where a first terminal of the first input winding is connected with the input module, and a second terminal of the first input winding is connected with the feedback module;

a first output winding, where a first terminal of the first output winding is grounded, and a second terminal of the first output winding is connected with the output module; and a second output winding, where a first terminal of the second output winding is connected with the second terminal of the first output winding, and a second terminal of the second output winding is connected with the output module.

In the display device of the present disclosure, the output module includes a first output unit and a second output unit, where the first output unit includes a first group of diodes and a first capacitor, an anode of the first group of diodes is connected with the second terminal of the first output winding, a cathode of the first group of diodes outputs the first output voltage, a terminal of the first capacitor is connected with the cathode of the first group of diodes, and another terminal of the first capacitor is grounded; and where the second output unit includes a second group of diodes and a second capacitor, an anode of the second group of diodes is connected with the second terminal of the second output winding, a cathode of the second group of diodes outputs the second output voltage, a terminal of the second capacitor is connected with the cathode of the second group of diodes, and another terminal of the second capacitor is grounded.

In the display device of the present disclosure, the first group of diodes includes at least two diodes which are connected in parallel with each other, and the second group of diodes includes at least two diodes which are connected in parallel with each other.

In the display device of the present disclosure, the feedback module includes a voltage regulator, a photoelectric conversion module, a PWM controller, and a feedback switch transistor;

a control terminal of the voltage regulator is connected with the cathode of the first group of diodes through the first feedback resistor, and is connected with the cathode of the second group of diodes through the second feedback resistor, an input terminal of the voltage regulator is connected with the cathode of the second group of diodes, and an output terminal of the voltage regulator is grounded;

an input terminal of the photoelectric conversion module is connected with the cathode of the second group of diodes through the sense resistor, and an output terminal of the photoelectric conversion module is connected with a feedback terminal of the PWM controller;

a control terminal of the PWM controller is connected with a control terminal of the feedback switch transistor, an input terminal of the feedback switch transistor is connected with a second terminal of the first input winding, and a current sense terminal of the PWM controller is connected with an output terminal of the feedback switch transistor; and an output terminal of the feedback switch transistor is grounded.

In the display device of the present disclosure, a resistance ratio of the first feedback resistor and the second feedback resistor is determined by a ratio of output voltages of the first output unit and the second output unit.

In the display device of the present disclosure, the resistance ratio of the first feedback resistor and the second feedback resistor and the ratio of output voltages of the first output unit and the second output unit are approximately the same.

In the display device of the present disclosure, the first output voltage is a main board driving voltage, and the second output voltage is a backlight driving voltage.

In the display device of the present disclosure, the input module includes a rectifier bridge and a filter capacitor; and the input voltage is received by an input terminal of the rectifier bridge, an output terminal of the rectifier bridge is connected with a terminal of the filter capacitor and the voltage transformation module, respectively, and another terminal of the filter capacitor is grounded.

In comparison to a dual-output flyback voltage conversion circuit and a display device in the prior art, in the dual-output flyback voltage conversion circuit and the display device of the present disclosure, by providing the output module and the feedback module, an offset of cross regulation between several groups of output DC voltages can be effectively adjusted, and the stability of subsequent circuits of the display device can be increased, so as to solve technical problems caused by the prior art dual-output flyback voltage conversion circuit and display device having poor cross regulation, and the subsequent circuits of the display device having poor stability.

In order to make the present disclosure more clear, preferred embodiments and the drawings thereof are described in detail below.

DESCRIPTION OF SPECIFIC EMBODIMENTS OF THE INVENTION

The following embodiments refer to the accompanying drawings for exemplifying specific implementable embodiments of the present disclosure. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto.

In the drawings, the same reference symbol represents the same or similar components.

Figure 1:
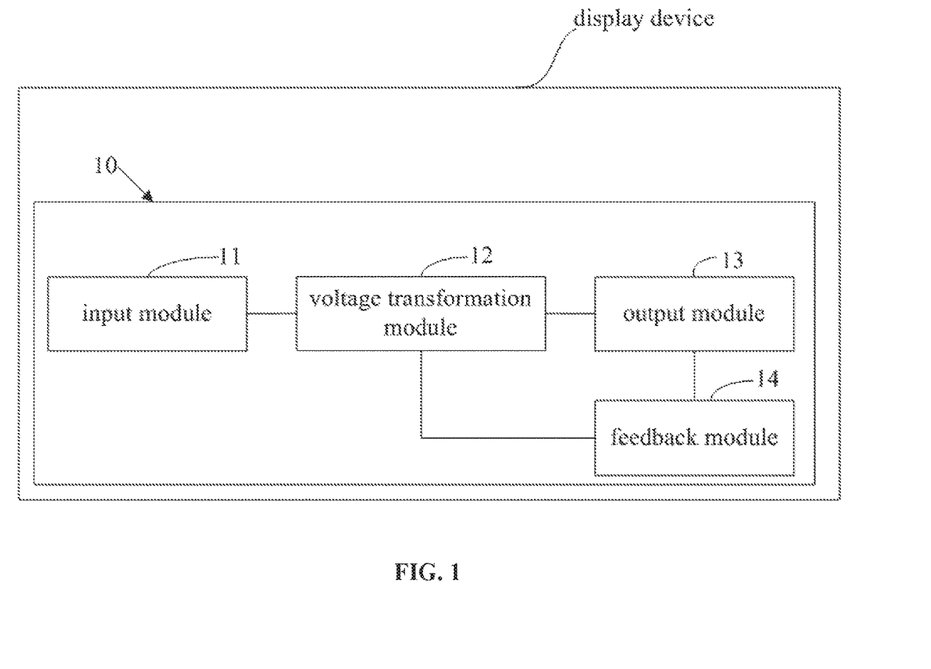
FIG. 1 is a schematic diagram of a dual-output flyback voltage conversion circuit according to a preferred embodiment of the present disclosure.
Figure 2:
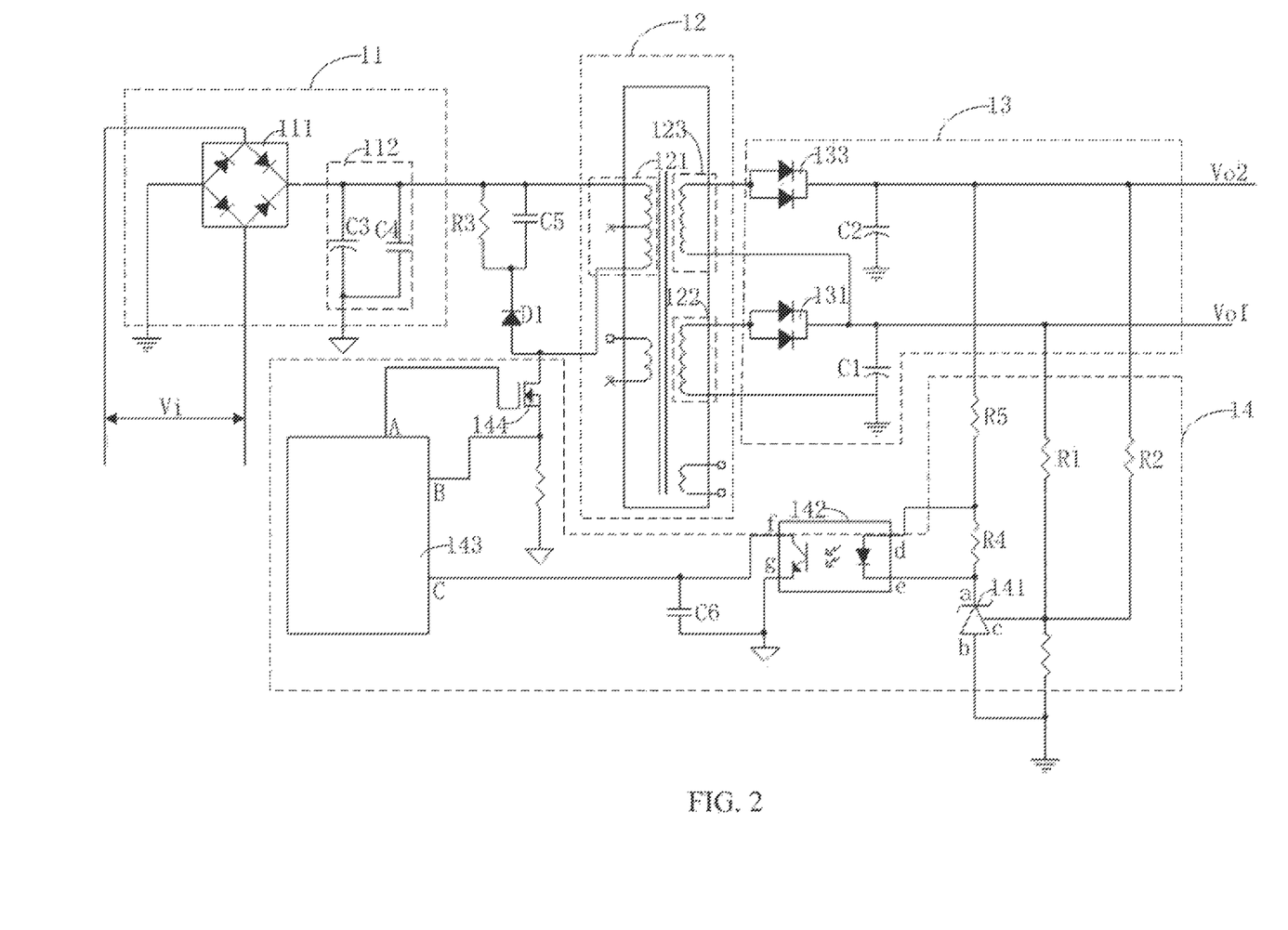
FIG. 2 is a schematic diagram of a circuit of a dual-output flyback voltage conversion circuit according to a preferred embodiment of the present disclosure.

Refer to FIG. 1 and FIG. 2, a dual-output flyback voltage conversion circuit 10 according to a preferred embodiment of the present disclosure includes an input module 11, a voltage transformation module 12, an output module 13, and a feedback module 14.

The input module 11 is used for rectifying and filtering an input voltage. The voltage transformation module 12 is used for performing a voltage conversion process on the input voltage which is obtained after rectifying and filtering to obtain a first conversion voltage and a second conversion voltage. The output module 13 is used for outputting a first output voltage according to the first conversion voltage, and outputting a second output voltage according to the second conversion voltage. The feedback module 14 is used for controlling the voltage transformation module 12 to output the input voltage which is obtained after rectifying and filtering according to the first output voltage and the second output voltage, where the first output voltage may be a main board driving voltage, and the second output voltage may be a backlight driving voltage.

Refer to FIG. 2, the input module 11 includes a rectifier bridge 111 and a filter capacitor 112. The input voltage is inputted into an input terminal of the rectifier bridge 111. An output terminal of the rectifier bridge 111 is connected with a terminal of the filter capacitor 112 and the voltage transformation module 12, respectively. Another terminal of the filter capacitor 112 is grounded. Alternatively, the filter capacitor 112 may include a third capacitor C3 and a fourth capacitor C4 which are connected in parallel with each other.

The voltage transformation module 12 includes a first input winding 121, a first output winding 122, and a second output winding 123. A first terminal of the first input winding 121 is connected with the input module 11, and a second terminal of the first input winding 121 is connected with the feedback module 14. A first terminal of the first output winding 122 is grounded, and a second terminal of the first output winding 122 is connected with the output module 13. A first terminal of the second output winding 123 is connected with the second terminal of the first output winding 122, and a second terminal of the second output winding 123 is connected with the output module 13.

Specifically, the first terminal of the first input winding 121 is connected with the output terminal of the rectifier bridge 111 of the input module 11. The second terminal of the first input winding 121 is connected with the output terminal of the rectifier bridge 111 of the input module 11 through a diode D1, a third resistor R3, and a fifth capacitor C5. An anode of the diode D1 is connected with the second terminal of the first input winding 121. A cathode of the diode D1 is connected with a terminal of the third resistor R3 and a terminal of the fifth capacitor C5, respectively. Another terminal of the third resistor R3 and another terminal of the fifth capacitor C5 are connected with the output terminal of the rectifier bridge 111 of the input module 11, respectively.

The output module 13 includes a first output unit and a second output unit.

The first output unit includes a first group of diodes 131 and a first capacitor C1. An anode of the first group of diodes 131 is connected with the second terminal of the first output winding 122, and a cathode of the first group of diodes 131 outputs the first output voltage. A terminal of the first capacitor C1 is connected with the cathode of the first group of diodes 131, and another terminal of the first capacitor C1 is grounded. The first group of diodes 131 includes at least two diodes which are connected in parallel with each other.

The second output unit includes a second group of diodes 133 and a second capacitor C2. An anode of the second group of diodes 133 is connected with the second terminal of the second output winding 123, and a cathode of the second group of diodes 133 outputs the second output voltage. A terminal of the second capacitor C2 is connected with the cathode of the second group of diodes 133, and another terminal of the second capacitor C2 is grounded. The second group of diodes 133 includes at least two diodes which are connected in parallel with each other.

The feedback module 14 includes a voltage regulator 141, a photoelectric conversion module 142, a PWM controller 143, and a feedback switch transistor 144. A model number of the voltage regulator 141 can be AZ431AN. The voltage regulator 141 includes an input terminal a, an output terminal b, and a control terminal c for outputting a reference voltage, such that the second output voltage outputted by the cathode of the second group of diodes 133 may be preferably fed back by a feedback voltage between the input terminal a and the output terminal b of the voltage regulator 141.

The PWM controller 143 includes a control terminal A for controlling whether the voltage transformation module is operating, a current sense terminal B for detecting an input current, and a feedback terminal C for receiving a feedback signal outputted by the photoelectric conversion module 142.

The control terminal c of the voltage regulator 141 is connected with the cathode of the first group of diodes 131 through a first feedback resistor R1, and is connected with the cathode of the second group of diodes 133 through a second feedback resistor R2. The input terminal a of the voltage regulator 141 is connected with the cathode of the second group of diodes 133. The output terminal b of the voltage regulator 141 is grounded.

Alternatively, the input terminal a of the voltage regulator 141 is connected with the cathode of the second group of diodes 133 through a sense resistor R4 and a fifth resistor R5.

An input terminal of the photoelectric conversion module 142 is connected with the cathode of the second group of diodes 133 through the sense resistor R4. An output terminal of the photoelectric conversion module 142 is connected with the feedback terminal C of the PWM controller 143.

Specifically, a first input terminal d of the photoelectric conversion module 142 is connected with the input terminal a of the voltage regulator 141 through the sense resistor R4. A second input terminal e of the photoelectric conversion module 142 is directly connected with the input terminal a of the voltage regulator 141. A first output terminal f of the photoelectric conversion module 142 is directly connected with the feedback terminal C of the PWM controller 143. A second output terminal g of the photoelectric conversion module 142 is connected with the feedback terminal C of the PWM controller 143 through a sixth capacitor C6. The second output terminal g of the photoelectric conversion module 142 is grounded.

The control terminal A of the PWM controller 143 is connected with a control terminal of the feedback switch transistor 144. An input terminal of the feedback switch transistor 144 is connected with the second terminal of the first input winding 121. The current sense terminal B of the PWM controller 143 is connected with an output terminal of the feedback switch transistor 144. The output terminal of the feedback switch transistor 144 is grounded.

In order to make the feedback voltage between the input terminal a and the output terminal b of the voltage regulator 141 more accurate, a resistance ratio of the first feedback resistor R1 and the second feedback resistor R2 is determined by a ratio of output voltages of the first output unit and the second output unit.

Alternatively, the resistance ratio of the first feedback resistor R1 and the second feedback resistor R2 and the ratio of output voltages of the first output unit and the second output unit are approximately the same. For example, if the output voltage of the first output unit is 12V and the output voltage of the second output unit is 24V, the ratio between the first feedback resistor R1 and the second feedback resistor R2 can be changed: (12-2.5):(24-2.5), where the reference voltage outputted by the voltage regulator 141 is 2.5V.

In order to facilitate the disposition of the first feedback resistor R1 and second feedback resistor R2, the resistance ratio between the first feedback resistor R1 and the second feedback resistor R2 can be the same as the ratio between the output voltage of the first output unit and the output voltage of the second output unit. If the output voltage of the first output unit is 12V and the output voltage of the second output unit is 24V, the ratio between the first feedback resistor R1 and the second feedback resistor R2 can be 12:24 (i.e., a 1:2 ratio).

In the use of the dual-output flyback voltage conversion circuit 10 of the preferred embodiment of the present disclosure, the input voltage (e.g. a voltage Vi) is firstly rectified by the rectifier bridge 111 of the input module 11, and then the input voltage is filtered by the filter capacitor 112 of the input module 11.

Then, the input voltage which is obtained after rectifying and filtering is inputted into the first input winding 121 of the voltage transformation module 12. The first output winding 122 of the voltage transformation module 12 outputs the first conversion voltage, and the second output winding 123 of the voltage transformation module 12 outputs the second conversion voltage.

Then, the first output unit of the output module 13 outputs the first output voltage (e.g., a voltage Vo1) according to the first conversion voltage. The second output unit of the output module 13 outputs the second output voltage (e.g., a voltage Vo2) according to the second conversion voltage.

While the output module 13 outputs the first output voltage and the second output voltage, a feedback voltage is generated by the voltage regulator 141 of the feedback module 14 according to the first output voltage and the second output voltage. A feedback signal is generated by the photoelectric conversion module 142 of the feedback module 14 according to the feedback voltage, and is transmitted to the feedback terminal C of the PWM controller 143. The feedback switch transistor 144 is controlled to be either turned on or turned off by the control terminal A of the PWM controller 143 of the output module 14 according to the feedback signal received by the feedback terminal C, thereby controlling whether the input voltage which is obtained after rectifying and filtering is outputted by the voltage transformation module 12 or not.

If the main board driving voltage (i.e., the first output voltage) outputted by the first output unit is 12V, then the backlight driving voltage (i.e., the second output voltage) outputted by the second output unit is 24V. The second output voltage outputted by the second output unit is directly acquired by the feedback module 14, thereby controlling the magnitude of the second output voltage by controlling the operating time of the voltage transformation module 12. Since the second output winding 123 is grounded by the first terminal of the first output winding 122, by setting a winding ratio of the first output winding 122 and the second output winding 123, such as 1:1, etc., the magnitude of the first output voltage can be controlled by changing the magnitude of the second output voltage. Thus, a better coupling effect of the first output winding 122 and second output winding 123 is achieved, thereby reducing the leakage inductance on the two outputs.

The first output voltage and second output voltage will not be affected by whether the first output unit and the second output unit are connected to the load and whether the load power of the first output unit and the second output unit are the same or not, thereby ensuring the stability of the first output voltage and second output voltage, and also reducing the coil winding of the second output winding 123.

Furthermore, the resistance ratio of the first feedback resistor R1 and the second feedback resistor R2 and the ratio of the output voltage of the first output unit and the output voltage of the second output unit are approximately the same. Since the control terminal c of the voltage regulator 141 outputs a stable reference voltage, the first output voltage of the first output unit can be stably controlled by the first feedback resistor R1, and the second output voltage of the second output unit can be stably controlled by the second feedback resistor R2, such that the stability of the first output voltage and the second output voltage are further improved by the voltage regulator 141 of the feedback module 14, thereby preventing the offset between the first output voltage and the second output voltage.

If the output current of the first output unit and the output current of the second output unit are the same, the resistance ratio of the first feedback resistor R1 and second feedback resistor R2 is generally similar to the ratio of the output power of the first output unit and the second output unit.

Therefore, the output process of the plurality of sets of DC voltages of the dual-output flyback voltage conversion circuit of the present preferred embodiment is accomplished.

If the first output unit is set with a load and the second output unit is set without a load, the main board driving voltage may be 12V (at 0 A), 11.9V (at 0.5 A), 11.8V (at 1 A), 11.6V (at 1.5 A), or 11.5V (at 2 A). The backlight driving voltage may be 24V (at 0 A), 24.2V (at 0.5 A), 24.5V (at 1 A), 24.6V (at 1.5 A), or 24.8V (at 2 A).

If the first output unit is set without a load and the second output unit is set with a load, the main board driving voltage may be 12V (at 0 A), 11.9V (at 0.5 A), 11.8V (at 1 A), 11.5V (at 1.5 A), or 11.4V (at 2 A). The backlight driving voltage may be 24V (at 0 A), 24.0V (at 0.5 A), 23.9V (at 1 A), 23.7V (at 1.5 A), or 23.5V (at 2 A).

From the above data, it can be seen that an offset of cross regulation between the different output DC voltages can be better eliminated by the dual-output flyback voltage conversion circuit of the present preferred embodiment.

In the dual-output flyback voltage conversion circuit of the present disclosure, by providing the output module and the feedback module, the offset of cross regulation between several groups of output DC voltages can be effectively adjusted, and the stability of subsequent circuits of the display device can be increased.

The present disclosure also provides a display device, which is driven by a dual-output flyback voltage conversion circuit. The dual-output flyback voltage conversion circuit includes an input module, a voltage transformation module, an output module, and a feedback module. The input module is used for rectifying and filtering an input voltage. The voltage transformation module is used for performing a voltage conversion process on the input voltage which is obtained after rectifying and filtering to obtain a first conversion voltage and a second conversion voltage. The output module is used for outputting a first output voltage according to the first conversion voltage, and outputting a second output voltage according to the second conversion voltage. The feedback module is used for controlling the voltage transformation module to output the input voltage which is obtained after rectifying and filtering according to the first output voltage and the second output voltage.

Preferably, the voltage transformation module includes a first input winding, a first output winding, and a second output winding. A first terminal of the first input winding is connected with the input module, and a second terminal of the first input winding is connected with the feedback module. A first terminal of the first output winding is grounded, and a second terminal of the first output winding is connected with the output module. A first terminal of the second output winding is connected with the second terminal of the first output winding, and a second terminal of the second output winding is connected with the output module.

Preferably, the output module includes a first output unit and a second output unit. The first output unit includes a first group of diodes and a first capacitor. An anode of the first group of diodes is connected with the second terminal of the first output winding, and a cathode of the first group of diodes outputs the first output voltage. A terminal of the first capacitor is connected with the cathode of the first group of diodes, and another terminal of the first capacitor is grounded. The first group of diodes includes at least two diodes which are connected in parallel with each other. The second output unit includes a second group of diodes and a second capacitor. An anode of the second group of diodes is connected with the second terminal of the second output winding, and a cathode of the second group of diodes outputs the second output voltage. A terminal of the second capacitor is connected with the cathode of the second group of diodes, and another terminal of the second capacitor is grounded. The second group of diodes includes at least two diodes which are connected in parallel with each other.

Preferably, the first group of diodes includes at least two diodes which are connected in parallel with each other, and the second group of diodes includes at least two diodes which are connected in parallel with each other.

Preferably, the feedback module includes a voltage regulator, a photoelectric conversion module, a PWM controller, and a feedback switch transistor. An input terminal of the voltage regulator is connected with the cathode of the first group of diodes through the first feedback resistor, and is connected with the cathode of the second group of diodes through the second feedback resistor. An input terminal of the photoelectric conversion module is connected with the cathode of the second group of diodes through the sense resistor, and an output terminal of the photoelectric conversion module is connected with a feedback terminal of the PWM controller. A control terminal of the PWM controller is connected with a control terminal of the feedback switch transistor, and an input terminal of the feedback switch transistor is connected with a second terminal of the first input winding. A current sense terminal of the PWM controller is connected with an output terminal of the feedback switch transistor. An output terminal of the feedback switch transistor is grounded.

Preferably, the resistance ratio of the first feedback resistor and the second feedback resistor and the ratio of output voltages of the first output unit and the second output unit are approximately the same.

Preferably, a model number of the voltage regulator is AZ431AN.

Preferably, the first output voltage is a main board driving voltage, and the second output voltage is a backlight driving voltage.

Preferably, the input module includes a rectifier bridge and a filter capacitor. The input voltage is received by an input terminal of the rectifier bridge, and an output terminal of the rectifier bridge is connected with a terminal of the filter capacitor and the voltage transformation module, respectively, and another terminal of the filter capacitor is grounded.

A specific operation principle of the display device is the same as the dual-output flyback voltage conversion circuit in the description in the above preferred embodiments. For details, refer to the description in the above preferred embodiments of the dual-output flyback voltage conversion circuit.

In the dual-output flyback voltage conversion circuit and the display device of the present disclosure, by providing the output module and the feedback module, an offset of cross regulation between several groups of output DC voltages can be effectively adjusted, and the stability of subsequent circuits of the display device can be increased, so as to solve technical problems caused by the prior art dual-output flyback voltage conversion circuit and display device having poor cross regulation, and the subsequent circuits of the display device having poor stability.

The above descriptions are merely preferable embodiments of the present disclosure, and are not intended to limit the scope of the present disclosure. Any modification or replacement made by those skilled in the art without departing from the spirit and principle of the present disclosure should fall within the protection scope of the present disclosure. Therefore, the protection scope of the present disclosure is subject to the appended claims.

What is claimed is:

1. A dual-output flyback voltage conversion circuit, comprising:
an input module, for rectifying and filtering an input voltage;
a voltage transformation module, for performing a voltage conversion process on the input voltage which is obtained after rectifying and filtering to obtain a first conversion voltage and a second conversion voltage, wherein the voltage transformation module comprises:
a first input winding, wherein a first terminal of the first input winding is connected to the input module, and a second terminal of the first input winding is connected to a feedback module;
a first output winding, wherein a first terminal of the first output winding is grounded, and a second terminal of the first output winding is connected to an output module; and
a second output winding, wherein a first terminal of the second output winding is connected with the second terminal of the first output winding, and a second terminal of the second output winding is connected to the output module; wherein
the output module is configured for outputting a first output voltage according to the first conversion voltage, and outputting a second output voltage according to the second conversion voltage;
the feedback module configured to control a voltage at the first input winding of the voltage transformation module according to the first output voltage and the second output voltage;
wherein the first output voltage is a main board driving voltage, and the second output voltage is a backlight driving voltage;
wherein the output module comprises a first output unit and a second output unit, wherein the first output unit comprises a first group of diodes and a first capacitor, an anode of the first group of diodes is connected to the second terminal of the first output winding, a cathode of the first group of diodes outputs the first output voltage, a terminal of the first capacitor is connected to the cathode of the first group of diodes, and another terminal of the first capacitor is grounded; and
wherein the second output unit comprises a second group of diodes and a second capacitor, an anode of the second group of diodes is connected to the second terminal of the second output winding; a cathode of the second group of diodes outputs the second output voltage, a terminal of the second capacitor is connected to the cathode of the second group of diodes, and another terminal of the second capacitor is grounded.

2. A dual-output flyback voltage conversion circuit, comprising:
an input module, for rectifying and filtering an input voltage;
a voltage transformation module, for performing a voltage conversion process on the input voltage which is obtained after rectifying and filtering to obtain a first conversion voltage and a second conversion voltage, wherein the voltage transformation module comprises:
a first input winding, wherein a first terminal of the first input winding is connected to the input module, and a second terminal of the first input winding is connected to a feedback module;
a first output winding, wherein a first terminal of the first output winding is grounded, and a second terminal of the first output winding is connected to an output module; and
a second output winding, wherein a first terminal of the second output winding is connected with the second terminal of the first output winding, and a second terminal of the second output winding is connected to the output module; wherein
the output module is configured for outputting a first output voltage according to the first conversion voltage, outputting a second output voltage according to the second conversion voltage; and
the feedback module configured to control a voltage at the first input winding of the voltage transformation module according to the first output voltage and the second output voltage.

3. The dual-output flyback voltage conversion circuit as claimed in claim 2, wherein the output module comprises a first output unit and a second output unit, wherein the first output unit comprises a first group of diodes and a first capacitor, an anode of the first group of diodes is connected to the second terminal of the first output winding, a cathode of the first group of diodes outputs the first output voltage, a terminal of the first capacitor is connected to the cathode of the first group of diodes, and another terminal of the first capacitor is grounded; and wherein the second output unit comprises a second group of diodes and a second capacitor, an anode of the second group of diodes is connected to the second terminal of the second output winding, a cathode of the second group of diodes outputs the second output voltage, a terminal of the second capacitor is connected to the cathode of the second group of diodes, and another terminal of the second capacitor is grounded.

4. The dual-output flyback voltage conversion circuit as claimed in claim 3, wherein the first group of diodes comprises at least two diodes which are connected in parallel with each other, and the second group of diodes comprises at least two diodes which are connected in parallel with each other.

5. The dual-output flyback voltage conversion circuit as claimed in claim 3, wherein the feedback module comprises a voltage regulator, a photoelectric conversion module, a pulse width modulation (PWM) controller, and a feedback switch transistor;

a control terminal of the voltage regulator is connected to the cathode of the first group of diodes through a first feedback resistor, and is connected to the cathode of the second group of diodes through a second feedback resistor, an input terminal of the voltage regulator is connected to the cathode of the second group of diodes; and an output terminal of the voltage regulator is grounded;

an input terminal of the photoelectric conversion module is connected to the cathode of the second group of diodes through a sense resistor, and an output terminal of the photoelectric conversion module is connected to a feedback terminal of the PWM controller;

a control terminal of the PWM controller is connected to a control terminal of the feedback switch transistor, an input terminal of the feedback switch transistor is connected to a second terminal of the first input winding, and a current sense terminal of the PWM controller is connected to an output terminal of the feedback switch transistor; and an output terminal of the feedback switch transistor is grounded.

6. The dual-output flyback voltage conversion circuit as claimed in claim 5, wherein a resistance ratio of the first feedback resistor and the second feedback resistor is determined by a ratio of the first and second output voltages of the first output unit and the second output unit.

7. The dual-output flyback voltage conversion circuit as claimed in claim 6, wherein the resistance ratio of the first feedback resistor and the second feedback resistor and the ratio of the first and second output voltages of the first output unit and the second output unit are approximately the same.

8. The dual-output flyback voltage conversion circuit as claimed in claim wherein the first output voltage is a main board driving voltage, and the second output voltage is a backlight driving voltage.

9. The dual-output flyback voltage conversion circuit as claimed in claim 2, wherein the input module comprises a rectifier bridge and a filter capacitor; and the input voltage is received by an input terminal of the rectifier bridge, an output terminal of the rectifier bridge is connected to a terminal of the filter capacitor and the voltage transformation module, and another terminal of the filter capacitor is grounded.

10. A display device, comprising a dual-output flyback voltage conversion circuit, which comprises:

an input module, for rectifying and filtering an input voltage;

a voltage transformation module, for performing a voltage conversion process on the input voltage which is obtained after rectifying and filtering to obtain a first conversion voltage and a second conversion voltage, wherein the voltage transformation module comprises:

a first input winding, wherein a first terminal of the first input winding is connected to the input module, and a second terminal of the first input winding is connected to a feedback module;

a first output winding, wherein a first terminal of the first output winding is grounded, and a second terminal of the first output winding is connected to an output module; and a second output winding, wherein a first terminal of the second output winding is connected to the second terminal of the first output winding, and a second terminal of the second output winding is connected to the output module; wherein the output module is configured for outputting a first output voltage according to the first conversion voltage, and outputting a second output voltage according to the second conversion voltage;

the feedback module configured to control a voltage at the first input winding of the voltage transformation module according to the first output voltage and the second output voltage.

11. The display device as claimed in claim 10, wherein the output module comprises a first output unit and a second output unit, wherein the first output unit comprises a first group of diodes and a first capacitor, an anode of the first group of diodes is connected to the second terminal of the first output winding, a cathode of the first group of diodes outputs the first output voltage, a terminal of the first capacitor is connected to the cathode of the first group of diodes, and another terminal of the first capacitor is grounded; and wherein the second output unit comprises a second group of diodes and a second capacitor, an anode of the second group of diodes is connected to the second terminal of the second output winding, a cathode of the second group of diodes outputs the second output voltage, a terminal of the second capacitor is connected to the cathode of the second group of diodes, and another terminal of the second capacitor is grounded.

12. The display device as claimed in claim 11, wherein the first group of diodes comprises at least two diodes which are connected in parallel with each other, and the second group of diodes comprises at least two diodes which are connected in parallel with each other.

13. The display device as claimed in claim 11, wherein the feedback module comprises a voltage regulator, a photoelectric conversion module, a PWM controller, and a feedback switch transistor;

a control terminal of the voltage regulator is connected to the cathode of the first group of diodes through a first feedback resistor, and is connected to the cathode of the second group of diodes through a second feedback resistor, an input terminal of the voltage regulator is connected to the cathode of the second group of diodes, and an output terminal of the voltage regulator is grounded;

an input terminal of the photoelectric conversion module is connected to the cathode of the second group of diodes through the sense resistor, and an output terminal of the photoelectric conversion module is connected to a feedback terminal of the PWM controller;

a control terminal of the PWM controller is connected to a control terminal of the feedback switch transistor, an input terminal of the feedback switch transistor is connected to a second terminal of the first input winding, a current sense terminal of the PWM controller is connected to an output terminal of the feedback switch transistor; and an output terminal of the feedback switch transistor is grounded.

14. The display device as claimed in claim 13, wherein a resistance ratio of the first feedback resistor and the second feedback resistor is determined by a ratio of the first and second output voltages of the first output unit and the second output unit.

15. The display device as claimed in claim 14, wherein the resistance ratio of the first feedback resistor and the second feedback resistor and the ratio of the first and second output voltages of the first output unit and the second output unit are approximately the same.

16. The display device as claimed in claim 10, wherein the first output voltage is a main board driving voltage, and the second output voltage is a backlight driving voltage.

17. The display device as claimed in claim 10, wherein the input module comprises a rectifier bridge and a filter capacitor; and the input voltage is received by an input terminal of the rectifier bridge, an output terminal of the rectifier bridge is connected to a terminal of the filter capacitor and the voltage transformation module, and another terminal of the filter capacitor is grounded.

* * * * *